(12) United States Patent
Freller

(10) Patent No.: US 7,942,666 B2
(45) Date of Patent: May 17, 2011

(54) APPARATUS FOR BURNING ORGANIC SUBSTANCES

(76) Inventor: Walter Freller, Mondsee (AT)

( * ) Notice: Subject to any disclaimer, the term of this patent is extended or adjusted under 35 U.S.C. 154(b) by 476 days.

(21) Appl. No.: 12/223,892

(22) PCT Filed: Feb. 13, 2007

(86) PCT No.: PCT/AT2007/000070
§ 371 (c)(1),
(2), (4) Date: Aug. 12, 2008

(87) PCT Pub. No.: WO2007/092977
PCT Pub. Date: Aug. 23, 2007

(65) Prior Publication Data
US 2010/0227287 A1 Sep. 9, 2010

(30) Foreign Application Priority Data
Feb. 16, 2006 (AT) .................................. A 245/2006

(51) Int. Cl.
*F23G 7/00* (2006.01)
(52) U.S. Cl. ......... 431/215; 110/254; 110/302; 110/308
(58) Field of Classification Search .................. 431/215; 110/254, 302, 308; 126/500–555
See application file for complete search history.

(56) References Cited

U.S. PATENT DOCUMENTS 127,500 A * 6/1872 Merrill ........................... 126/501

(Continued)

FOREIGN PATENT DOCUMENTS
EP 0 038 962 11/1981
(Continued)

OTHER PUBLICATIONS

International Search Report, Theis, Gilbert; European Patent Office; May 7, 2007.

*Primary Examiner* — Kenneth B Rinehart
*Assistant Examiner* — Jorge Pereiro
(74) *Attorney, Agent, or Firm* — Collard & Roe P.C.

(57) ABSTRACT

An apparatus is described for burning organic substances, comprising a horizontal combustion chamber (2) provided in a housing (1) and heat-insulated against said housing (1), and a counter-flow heat exchanger (8) which preheats the combustion air with the help of the hot exhaust gases from the combustion chamber (2) and which forms a flow duct (10) for the combustion air between the combustion chamber (2) and a heat-exchanger wall (9) enclosing the combustion chamber (2), as well as a flow duct (11) for the hot exhaust gases on the side of the heat-exchanger wall (9) averted from the combustion chamber (2). In order to provide advantageous constructional conditions it is proposed that the heat-exchanger wall (9) of the counter-flow heat exchanger (8) is provided on the outside of the heat insulation (3) of the combustion chamber (2) which comprises an upper exhaust outlet (7) opening into the housing (1), that heat exchangers (6) which extend parallel to the combustion chamber (2) are provided for the heating of a heat-transfer medium with the sensible waste heat of the hot exhaust gases in the upper interstices (4) obtained on either side of the cylindrical combustion chamber (2) between the combustion chamber (2) and the substantially prismatic housing (1), and that the exhaust-gas-receiving flow duct (11) of the counter-flow heat exchanger (8) for the exhaust gases originates from the two interstices (4), while the heat-exchanger wall (9) extends with the flow duct (10) for the combustion air into the interstices (4).

4 Claims, 2 Drawing Sheets

U.S. PATENT DOCUMENTS

| | | | | |
|---|---|---|---|---|
| 2,007,230 A | * | 7/1935 | Wade | 122/356 |
| 2,573,004 A | * | 10/1951 | Frank | 237/16 |
| 2,672,108 A | * | 3/1954 | Arnold | 431/165 |
| 2,936,724 A | * | 5/1960 | Bishop | 110/254 |
| 3,107,656 A | * | 10/1963 | McNeal | 122/236 |
| 3,128,756 A | * | 4/1964 | Galvin | 126/116 R |
| 3,357,377 A | * | 12/1967 | Stevens | 110/190 |
| 3,438,718 A | * | 4/1969 | Morck, Jr. | 431/158 |
| 3,507,265 A | * | 4/1970 | Dills et al. | 126/21 R |
| 3,587,557 A | * | 6/1971 | Henderson et al. | 126/21 A |
| 3,777,678 A | * | 12/1973 | Lutes et al. | 110/244 |
| 3,785,306 A | * | 1/1974 | Jaget et al. | 110/226 |
| 3,792,670 A | * | 2/1974 | DiNozzi | 110/213 |
| 3,794,459 A | * | 2/1974 | Meenan | 431/5 |
| 3,903,868 A | * | 9/1975 | Salvo | 122/18.31 |
| 4,128,094 A | * | 12/1978 | Lewis | 126/110 B |
| 4,318,689 A | * | 3/1982 | Forster et al. | 431/208 |
| 4,351,315 A | * | 9/1982 | Babbage | 126/501 |
| 4,373,472 A | * | 2/1983 | Kreis | 122/17.2 |
| 4,377,153 A | * | 3/1983 | Flagg | 126/502 |
| 4,441,880 A | * | 4/1984 | Pownall et al. | 432/13 |
| 4,557,248 A | * | 12/1985 | Richards | 126/107 |
| 4,565,184 A | | 1/1986 | Collins et al. | |
| 4,572,155 A | * | 2/1986 | Engblom | 126/76 |
| 4,577,616 A | * | 3/1986 | Lillo | 126/110 R |
| 4,589,374 A | * | 5/1986 | Farina | 122/18.31 |
| 4,597,375 A | * | 7/1986 | Pabis | 126/117 |
| 4,651,654 A | * | 3/1987 | Erlandsson et al. | 110/254 |
| 4,707,560 A | * | 11/1987 | Hottel et al. | 136/253 |
| 4,850,857 A | | 7/1989 | Obermuller | |
| 5,029,534 A | * | 7/1991 | Childs | 110/341 |
| 5,315,938 A | * | 5/1994 | Freller | 110/233 |
| 6,546,926 B1 | * | 4/2003 | Perrault | 126/77 |
| 6,579,086 B2 | * | 6/2003 | Fullemann et al. | 431/9 |
| 6,758,149 B2 | * | 7/2004 | Oiwa et al. | 110/211 |
| 6,769,424 B2 | * | 8/2004 | Perrault | 126/77 |
| 2003/0111071 A1 | * | 6/2003 | Perrault | 126/77 |
| 2003/0192684 A1 | * | 10/2003 | Roberts et al. | 165/163 |
| 2003/0226483 A1 | * | 12/2003 | Oiwa et al. | 110/235 |

FOREIGN PATENT DOCUMENTS

| | | |
|---|---|---|
| EP | 0 224 466 | 6/1987 |
| EP | 0 560 678 | 9/1993 |
| EP | 0 905 442 | 3/1999 |
| EP | 0 915 289 | 5/1999 |
| WO | WO 87/01434 | 3/1987 |

* cited by examiner

APPARATUS FOR BURNING ORGANIC SUBSTANCES

CROSS REFERENCE TO RELATED APPLICATIONS

This application is the National Stage of PCT/AT2007/000070 filed on Feb. 13, 2007, which claims priority under 35 U.S.C. §119 of Austrian Application No. A 245/2006 filed Feb. 16, 2006. The international application under PCT article 21(2) was not published in English.

FIELD OF THE INVENTION

The invention relates to an apparatus for burning organic substances, comprising a horizontal combustion chamber provided in a housing and heat-insulated against said housing, and a counter-flow heat exchanger which preheats the combustion air with the help of the hot exhaust gases from the combustion chamber and which forms a flow duct for the combustion air between the combustion chamber and a heat-exchanger wall enclosing the combustion chamber, as well as a flow duct for the hot exhaust gases on the side of the heat-exchanger wall averted from the combustion chamber.

DESCRIPTION OF THE PRIOR ART

In order to burn organic substances, and garbage in particular, it is known (U.S. Pat. No. 5,315,938 A) to provide the combustion chamber which is provided in a housing, is situated horizontally and supplied axially with a heat insulation against the housing receiving a liquid heat-transfer medium in order to ensure advantageous combustion conditions in the combustion chamber which cannot be impaired by any uncontrolled heat exchange with the surrounding heat-transfer medium. The combustion air supplied to the combustion chamber is preheated by means of the hot exhaust gases from the combustion chamber. For this purpose, a counter-flow heat exchanger which encloses the bottom part of the combustion chamber is provided within the heat insulation of the combustion chamber, which heat exchanger comprises a heat-exchanger wall in the form of a sheet corrugated in a meandering manner which separates the flow duct for the combustion air from the flow duct for the exhaust gases. Although an advantageous preheating of the combustion air is given by this measure, the remaining residual heat of the exhaust gases is not used. This is also difficult because the combustion chamber is separated by the heat insulation against the housing used as a storage means for the liquid heat-transfer medium, so that the exhaust gases need to be removed through the floor of the combustion chamber. Moreover, the combustion air is guided on the side of the heat-exchanger wall of the counter-flow heat exchanger facing the combustion chamber, so that an additional heat insulation needs to be provided between the flow duct for the combustion air and the combustion chamber in order to prevent any heat transfer from the combustion chamber to the combustion air.

SUMMARY OF THE INVENTION

The invention is thus based on the object of providing an apparatus for burning organic substances of the kind mentioned above in such a way that by maintaining advantageous combustion conditions a favorable utilization of the sensible waste heat of the hot exhaust gases from the combustion chamber is obtained, with a comparatively simple constructional effort.

This object is achieved by the invention in such a way that the heat-exchanger wall of the counter-flow heat exchanger is provided on the outside of the heat insulation of the combustion chamber which comprises an upper exhaust outlet opening into the housing, that heat exchangers which extend parallel to the combustion chamber are provided for the heating of a heat-transfer medium with the sensible waste heat of the hot exhaust gases in the upper interstices obtained on either side of the cylindrical combustion chamber between the same and the substantially prismatic housing, and that the flow duct of the counter-flow heat exchanger receiving the exhaust gases for the combustion air originates from the two interstices, while the heat-exchanger wall extends with the flow duct for the combustion air into the interstices.

Since the counter-flow heat exchanger encloses the combustion chamber outside of its heat insulation for preheating the combustion air, the temperature progression cannot have any disadvantageous influence on the combustion conditions in the combustion chamber during the heating of the combustion air. An additional factor is that the sensible waste heat of the exhaust gases flowing through an upper exhaust gas outlet from the combustion chamber into the housing can be utilized advantageously for the heating of a heat-transfer medium without having to omit the required preheating of the combustion air. It is merely necessary to provide respective heat exchangers in the interstices which are obtained on either side of the cylindrical combustion chamber and the prismatic housing, which heat exchangers are flowed around by hot exhaust gases emerging from the combustion chamber. When the exhaust gases are withdrawn from the interstices by the counter-flow heat exchanger for the combustion air, sufficient preheating of the combustion air is ensured, especially when the heat-exchanger wall extends in the circumferential direction of the combustion chamber into the interstices, so that a respective extension of the flow duct for the combustion air is achieved. An additional heat exchange occurs between the hot exhaust gases in the interstices and the combustion air guided through the flow duct via the heat-exchanger wall of the counter-flow heat exchanger extending into the interstices of the housing.

Especially advantageous constructional conditions are obtained when the flow duct of the counter-flow heat exchanger between the combustion chamber and the heat-exchanger wall opens in the area of the exhaust gas outlet into the combustion chamber, because in this case a percentage of the heated combustion air can be removed with the hot exhaust gases into the housing for improving afterburning in the interstices, which occurs depending on the respective flow conditions which can be set by constructional measures according to the respective requirements. For this purpose, the heat-exchanger wall of the counter-flow heat exchanger can cover the exhaust-gas outlet of the combustion chamber and comprise pass-through openings in the area of the exhaust-gas outlet.

In order to obtain simple constructional conditions also for the heat exchangers for heating the heat-transfer medium, the heat exchangers can comprise a flow pipe for the heat-transfer medium parallel to the axis of the combustion chamber in the interstices of the housing, which flow pipe is radially penetrated with pipe connection pieces for the exhaust gas guidance. As a result of these constructional measures, not only the flow pipes for the heat-transfer medium form a heat-exchanger surface, but also the pipe connection pieces which radially penetrate the flow pipes, which connection pieces are flowed through by hot exhaust gases flowing into the interstices of the housing, especially when they are adjusted with respect to their inclination to the flow conditions obtained in the interstices. The flow rate can also be improved by guide surfaces for the exhaust gas flow in the interstices.

BRIEF DESCRIPTION OF THE DRAWING

The subject matter of the invention is shown by way of example in the drawings, wherein.

DESCRIPTION OF THE PREFERRED EMBODIMENT

Figure 1:
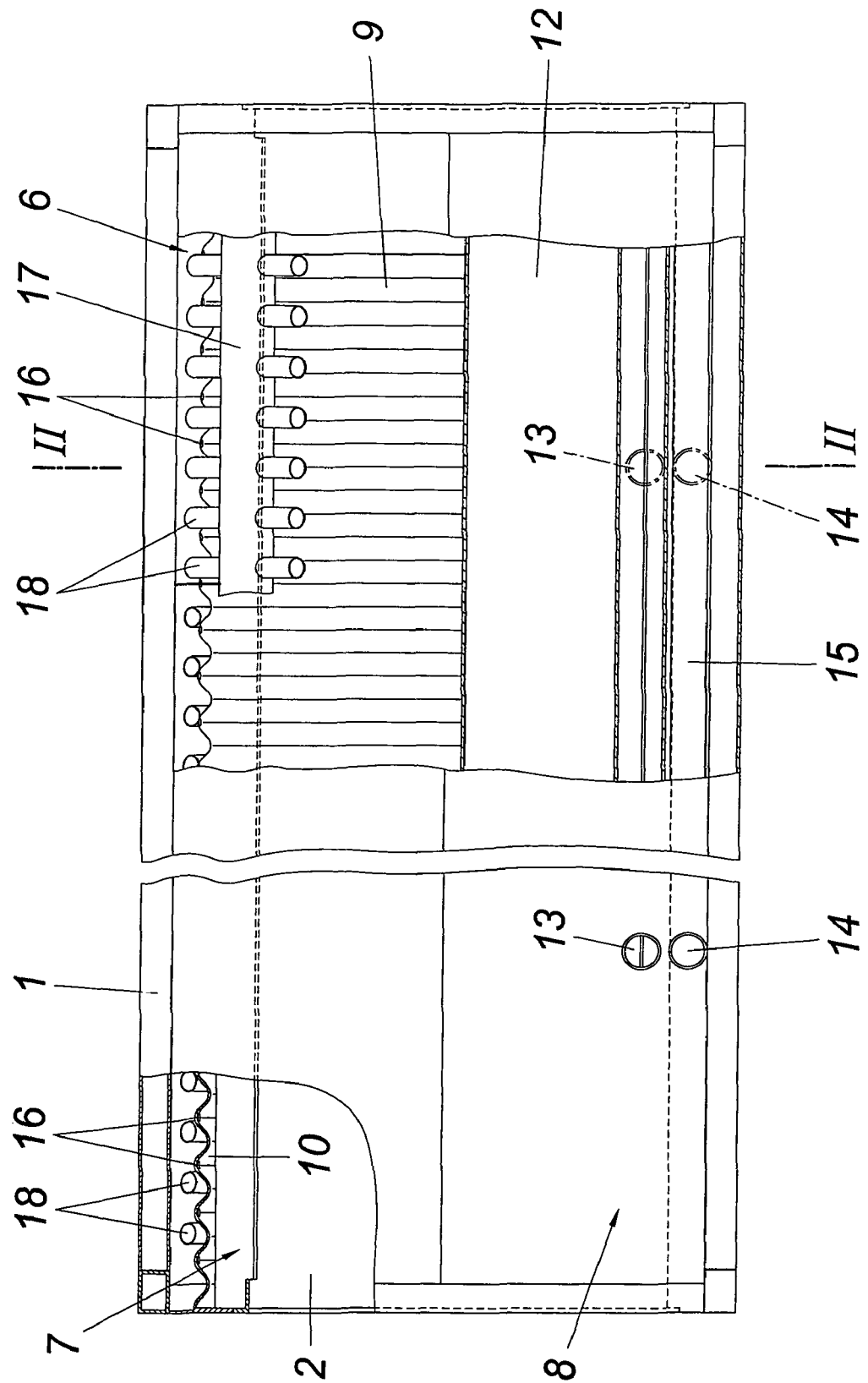
FIG. 1 shows an apparatus in accordance with the invention for burning organic substances in a partly sectional side view.

The apparatus for burning organic substances, especially garbage, comprises a prismatic housing 1 with a rectangular cross section and a substantially cylindrical combustion chamber 2 with a horizontal axis. Said combustion chamber is provided with a heat insulation 3 which screens the combustion chamber from the housing 1. As a result of the arrangement of a substantially cylindrical combustion chamber 2 in a prismatic housing 1 with rectangular cross section, interstices 4, 5 are obtained in the corner regions of the housing 1 between the combustion chamber 2 and the housing 1, of which the upper interstices 4 situated on either side of the combustion chamber 3 receive heat exchangers 6 for a heat-transfer medium, which heat exchangers extend parallel to the combustion chamber 2.

Figure 2:
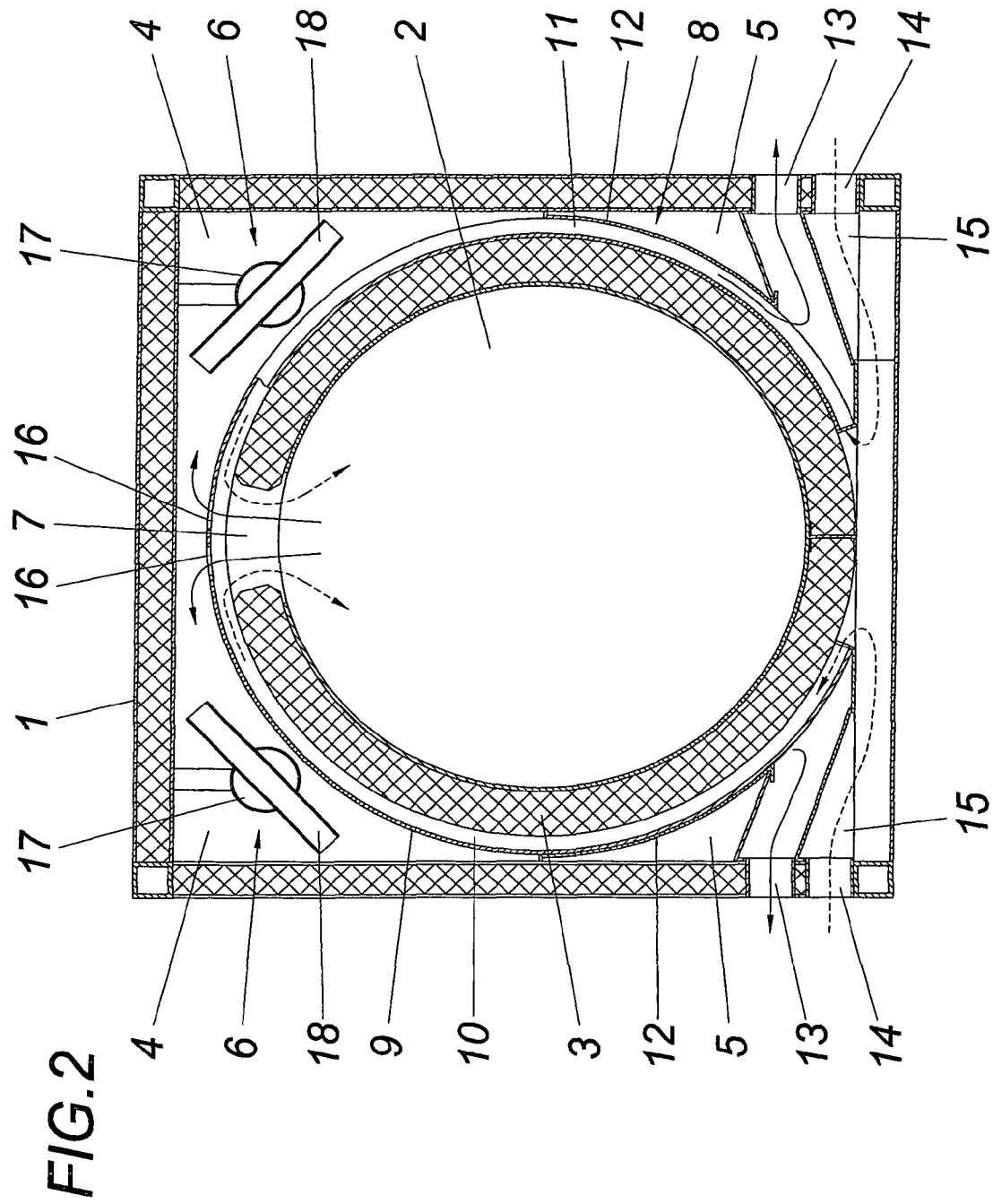
FIG. 2 shows this apparatus in a sectional view along the line II-II of FIG. 1.

The hot exhaust gases exit from the combustion chamber 2 through an exhaust-gas outlet 7 which is provided in the apex region of the combustion chamber 2 and extends substantially over the axial length of the combustion chamber 2 and flow to both sides into the interstices 4, as is indicated in FIG. 2 by the flow arrows shown with the unbroken lines. The hot exhaust gases exiting from the combustion chamber 2 are used not only for heating a heat-transfer medium, but also for preheating the combustion air required for waste incineration. For this purpose, an additional counter-flow heat exchanger 8 is provided which encloses the combustion chamber 2 on the outside of the heat insulation 3. The counter-flow heat exchanger 8 is formed substantially by a heat exchanger wall 9 which is coaxial to the heat insulation 3 and which is formed by a sheet which is profiled in a wave-like or meandering manner in the longitudinal direction of the combustion chamber 2, so that parallel flow paths extending in the circumferential direction for the combustion air on the one hand and the exhaust gases on the other hand are obtained by the wave crests and wave troughs. The arrangement is made in such a way that the flow paths on the inside of the heat exchanger wall 9 facing the combustion chamber 2 delimit a flow duct 10 for the combustion air and the flow paths on the outside of the heat exchanger wall 9 a flow duct 11 for the exhaust gases. As is shown especially in FIG. 1 in which the section is guided in the region of the left half of the drawing along a flow path of the flow duct 10 for the combustion air and in the region of the right half of the drawing along a flow path of flow duct 11 for the exhaust gases, the exhaust gases are conveyed only after the interstices 4 through a close flow duct 11 which is delimited by a guide wall 12 covering the heat exchanger wall 9. This means that a forced guidance is also provided for the exhaust gases in the bottom interstices 5 before the exhaust gases are removed via the exhaust connections 13.

The supply of combustion air also occurs through the bottom interstices 5, namely through air connections 14 which extend beneath the exhaust gas connections 13 and open into a distributor chamber 15 which is sealed against the exhaust gases. As is shown by the flow arrows for the combustion air in the broken lines in FIG. 2, the flow paths of the flow duct 10 for the combustion air open into the region of the exhaust gas outlet 7 of combustion chamber 2 because the heat exchanger wall 9 covers this exhaust gas outlet 7 and merely comprises pass-through openings 16 for the exhaust gases from the combustion chamber 2. This measure ensures that a portion of the combustion air is entrained with the hot exhaust gases into the interstices 4 and can become effective there as secondary air for advantageous postcombustion.

The hot exhaust gases flowing from the interstices 4 ensure the supply of heat to the heat exchanger 6 for heating a heat-transfer medium, preferably water. In order to ensure favorable heat transmissions, the heat exchangers 6 are formed by flow pipes 17 which are connected to a forward flow and a return flow of a heat-transfer medium circulation. This is not shown for reasons of clarity of the illustration. Said flow pipes 17 which extend parallel to the combustion chamber 2 are penetrated in the radial direction by pipe connection pieces 18 which are inclined in the direction of the main flow of the exhaust gases in the area of the heat exchangers 6, so that said pipe connection pieces 18 are flowed through by a partial flow of the hot exhaust gases.

The charging of the combustion chamber 2 with the waste to be incinerated occurs from the front side, advantageously via a feeding stamp which displaces the waste to be incinerated which is introduced into a coaxial cylinder upstream of the combustion chamber 2 from the cylinder to the combustion chamber 2 and can simultaneously form a closure for the combustion chamber 2 on the face side. The discharge of the obtained ash can occur from the other face side of the combustion chamber 2, for which there are various constructional possibilities. One of these is obtained with the help of a removal screw which is introduced from the face side into the combustion chamber and which conveys the ash or the incineration residue from the combustion chamber. It is understood that the combustion chamber 2 can also be provided with an ash receiving chamber beneath the combustion chamber 2, which receiving chamber is separated from the combustion chamber by a grating in order to remove the incineration residues from the ash receiving chamber.

During the incineration of the waste, the combustion air is conveyed with the help of at least one blower into the combustion chamber 2, with the obtained waste gases being removed in the described manner by advantageously utilizing its sensible waste heat. The inflow conditions for the combustion air to the combustion chamber 2 and the outflow conditions for the exhaust gases can be adjusted in the area of the exhaust gas outlet 7 by guide devices to the respective conditions. The exhaust gases withdrawn from housing 1 via exhaust gas connections 13 can optionally be admixed for optimizing emission-controlled waste incineration via an exhaust-gas scrubber and a condensate separator in a circulation partly to the combustion air, which occurs especially advantageously together with water vapor in order to ensure the respective reactions between the carbon, carbon monoxide, carbon dioxide, atmospheric oxygen and water vapor incurred during combustion at comparatively low combustion temperatures which suppress the formation of dioxins and other pollutants.

The invention claimed is:

1. An apparatus for burning organic substances, comprising a horizontal combustion chamber provided in a housing and heat-insulated against said housing, and a counter-flow heat exchanger which preheats the combustion air with the help of the hot exhaust gases from the combustion chamber and which forms a flow duct for the combustion air between the combustion chamber and a heat-exchanger wall enclosing the combustion chamber, as well as a flow duct for the hot exhaust gases on the side of the heat-exchanger wall averted from the combustion chamber, wherein the heat-exchanger wall (9) of the counter-flow heat exchanger (8) is provided on the outside of the heat insulation (3) of the combustion chamber (2) which comprises an upper exhaust outlet (7) opening into the housing (1), that heat exchangers (6) which extend parallel to the combustion chamber (2) are provided for the heating of a heat-transfer medium with the sensible waste heat of the hot exhaust gases in the upper interstices (4) obtained on either side of the cylindrical combustion chamber (2) between the combustion chamber (2) and the substantially prismatic housing (1), and wherein the exhaust-gas-receiving flow duct (11) of the counter-flow heat exchanger (8) for the exhaust gases originates from the two interstices (4), while the heat-exchanger wall (9) extends with the flow duct (10) for the combustion air into the interstices (4).

2. An apparatus according to claim 1, wherein the flow duct (10) of the counter-flow heat exchanger (8) for receiving the combustion air between the combustion chamber (2) and the heat-exchanger wall (9) opens into the combustion chamber (2) in the area of the exhaust gas outlet (7).

3. An apparatus according to claim 1, wherein the heat exchanger wall (9) of the counter-flow heat exchanger (8) covers the exhaust gas outlet (7) of the combustion chamber (2) and comprises pass-through openings (16) in the area of the exhaust gas outlet (7).

4. An apparatus according to claim 1, wherein the heat exchangers (6) can comprise for a heat-transfer medium in the interstices (4) of the housing (1) a flow pipe (17) for the heat-transfer medium which is parallel to the axis of the combustion chamber (2) and which is radially penetrated with pipe connection pieces (18) for the exhaust gas guidance.

* * * * *